United States Patent [19]

Dutcher

[11] Patent Number: 4,686,586
[45] Date of Patent: Aug. 11, 1987

[54] READ BACK CIRCUIT FOR RECOVERING DATA FROM MAGNETIC STORAGE MEDIUM

[75] Inventor: Alan P. Dutcher, Bensalem, Pa.

[73] Assignee: Oki America, Inc., Hackensack, N.J.

[21] Appl. No.: 820,299

[22] Filed: Jan. 21, 1986

[51] Int. Cl.$^4$ .......................... G11B 5/09; G11B 5/02
[52] U.S. Cl. ......................................... 360/46; 360/68
[58] Field of Search ............................. 360/46, 41, 68

[56] References Cited

U.S. PATENT DOCUMENTS

| | | | |
|---|---|---|---|
| 4,012,785 | 3/1977 | MacDougall, Jr. | 360/43 |
| 4,016,599 | 4/1977 | Sherer | 360/5 J |
| 4,467,374 | 8/1984 | Batley et al. | 360/46 |
| 4,499,508 | 2/1985 | Pettigrew | 360/41 |

Primary Examiner—Vincent P. Canney
Attorney, Agent, or Firm—Seidel, Gonda, Goldhammer & Abbott

[57] ABSTRACT

A read back circuit for recovering digital data stored on a magnetic storage medium as a series of sequential magnetic flux transitions comprises first means for providing a read signal indicative of magnetic flux transitions on the medium and second means operatively coupled to the first means for providing a differentiated read signal having zero crossings indicative of peaks in the read signal. A third means is operatively coupled to the second means for normally applying an offset to the differentiated read signal and for temporarily removing the offset during the occurrence of peaks in the read signal, thereby preventing erroneous zero crossings of the differentiated read signal.

20 Claims, 3 Drawing Figures

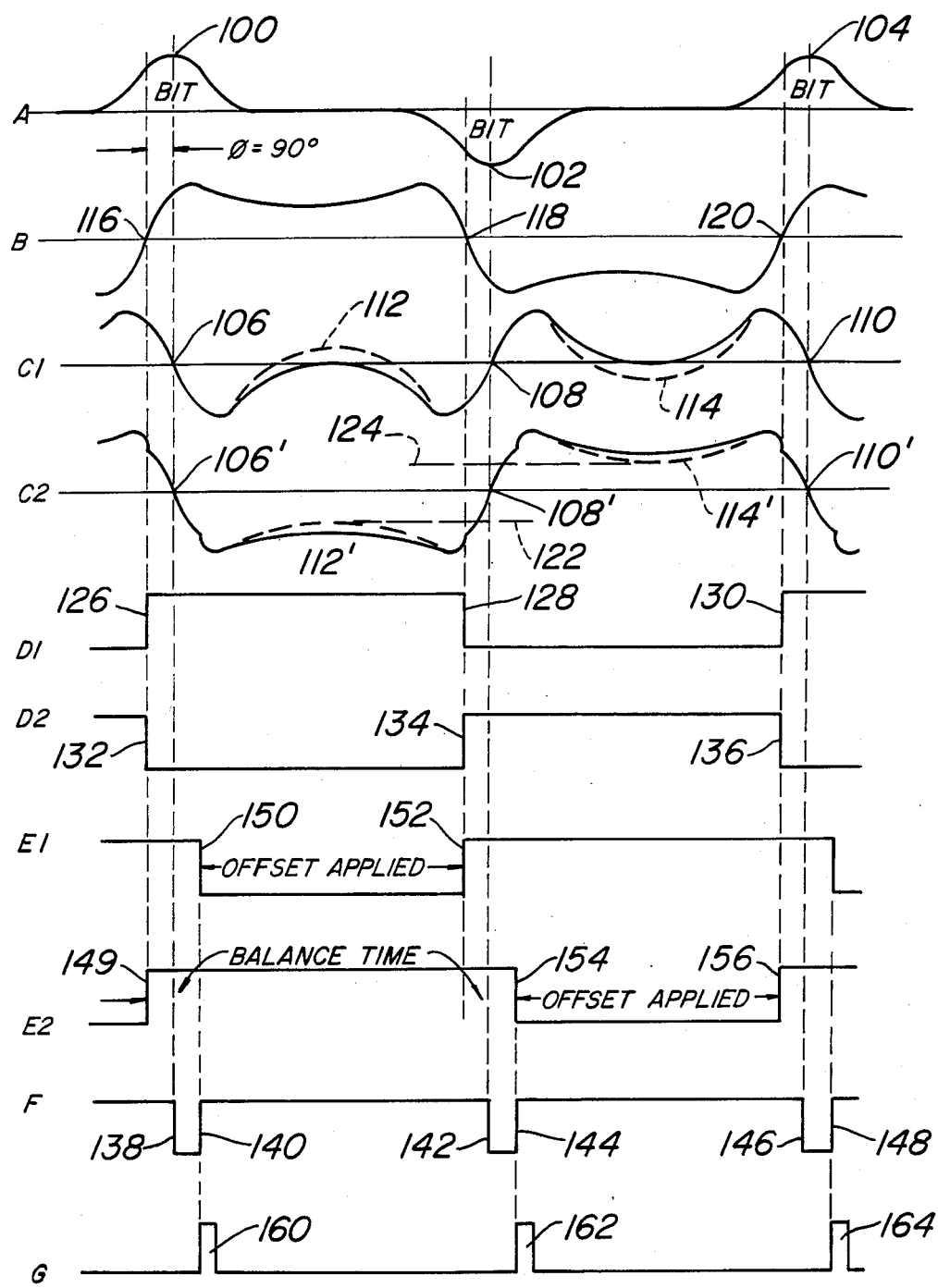

READ BACK CIRCUIT FOR RECOVERING DATA FROM MAGNETIC STORAGE MEDIUM

BACKGROUND OF THE INVENTION

The present invention relates generally to a read back circuit (also known as a "read chain" circuit) for recovering data from a storage medium or a transmission line. In particular, the present invention has application to read back circuits that utilize a differentiation technique for detecting peaks in recovered data. More particularly, the present invention is directed to an anti-shouldering circuit for use with dual density magnetic disk drives of the type that utilize a differentiator to detect peaks in the read signal.

Known read chain circuits include a read head, a read head preamplifier, a low pass filter (analog), a differentiator, a comparator and a time domain filter (digital). The read head preamplifier amplifies the signal from the read head to usable levels. The low pass filter reduces noise in the read circuit. The differentiator differentiates the read signal from the low pass filter and thus provides zero crossovers in time coincidence with peaks in the read signal. Thus, zero crossovers in the differentiated read signal are indicative of peaks, and hence data, in the read signal. The comparator squares the differentiated read signal into logic levels; changes in the logic levels provided by the comparator correspond to peaks in the read signal, and hence to data. The squared read data from the comparator is then supplied to a time domain filter and to a read data one shot circuit.

Various encoding techniques for storing digital data on a rotating magnetic medium, such as a floppy disk, are known. These include FM and MFM encoding techniques. Presently, it is customary to use a MFM encoding technique in dual density disk drives. Typically, the high density 2 F frequency is 250 KHz, the high density 1 F and low density 2 F frequencies are 125 KHz, and the low density 1 F frequency is 62.5 KHz.

A known problem with differentiator circuits for dual density disk drives is "shouldering" i.e., the differentiator output may "droop" between the occurrence of sequential peaks in the read signal. If the time between sequential peaks is long, as is common when low frequency patterns (e.g., low density 1 F data) are recorded on the outermost tracks of a disk, the differentiator output may "droop" so far as to provide an erroneous zero crossover, and hence erroneous data.

Moreover, known read chain circuits for dual density drives require two sets of filters to recover both high and low density data. This is due primarily to the design of the time domain filter. The typical time domain filter is a one shot circuit that disables (delays) the read data for a predetermined period of time after a zero crossover in the differentiated read signal has been detected. The time domain filter will tolerate only a one octave frequency span, but frequency spans as wide as two octaves (i.e., the span between high density 2 F data and low density 1 F data) are found in dual density drives. Thus, two separate time domain filters are required, i.e., one for high density data and one for low density data.

The present invention is directed to a read chain circuit that eliminates erroneous data due to shouldering and does not require a time domain filter.

SUMMARY OF THE INVENTION

A read back circuit for recovering data stored on a magnetic medium as a series of magnetic flux transitions comprises first means for providing a read signal indicative of magnetic flux transitions on the medium and second means operatively coupled to the first means for providing a differentiated read signal having zero crossings indicative of peaks in the read signal. A third means is operatively coupled to the second means for normally applying an offset to the differentiated read signal and for temporarily removing the offset during the occurrence of peaks in the read signal. The offset applied to the differentiated read signal prevents erroneous zero crossings and hence erroneous data.

The first means comprises a magnetic read head, a read head preamplifier and a low pass filter. The second means comprises an analog differentiator circuit and the third means comprises bit warning means for providing a "bit warning" signal indicative of an impending peak in the read signal and offset means for normally applying the offset to the differentiated read signal but responsive to the bit warning signal to remove the offset.

The bit warning means comprises phase shifting means operatively coupled to the output of the low pass filter for delaying the phase of the read signal by a prescribed amount and thereby provide a delayed read signal having zero crossings that occur before corresponding zero crossings of the differentiated read signal. According to the preferred embodiment of the invention, the phase shifting means comprises an all pass filter that delays the phase of the read signal by approximately 90°.

The bit warning means further comprises detection means operatively coupled to the output of the all pass filter for providing an output signal (i.e., the bit warning signals) indicative of zero crossings of the delayed read signal. According to the preferred embodiment of the invention, the detection means comprises a pair of comparators receiving the output from the all pass filter and providing complementary outputs having logic level changes that occur in time coincidence with zero crossings of the delayed read signal provided by the all pass filter. The comparators' outputs are the bit warning signals.

According to the preferred embodiment, the offset means comprises bistable means receiving (i) the bit warning signals and (ii) a "bit detection" signal provided in response to a zero crossing of the differentiated read signal and hence indicative of a detected bit. The time domain filter commonly found in read chain circuits is reconfigured to provide the "bit detection" signal after a prescribed time delay of a zero crossing of the differentiated read signal. However, no time delay or time domain filter is required. Any circuit that provides an indication that a bit has been detected will suffice. The bistable means is responsive to the bit warning signals and to the bit detection signal to apply and remove the offset applied to the differentiated read signal. The bistable means preferably comprises a pair of D flip flops that alter the polarity of the offset in accordance with the polarity of the differentiated read signal, but apply no offset when a peak is present in the read signal.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a timing diagram provided for the purpose of explaining the operation of the present invention.

DETAILED DESCRIPTION OF THE PREFERRED EMBODIMENT

Figure 1:
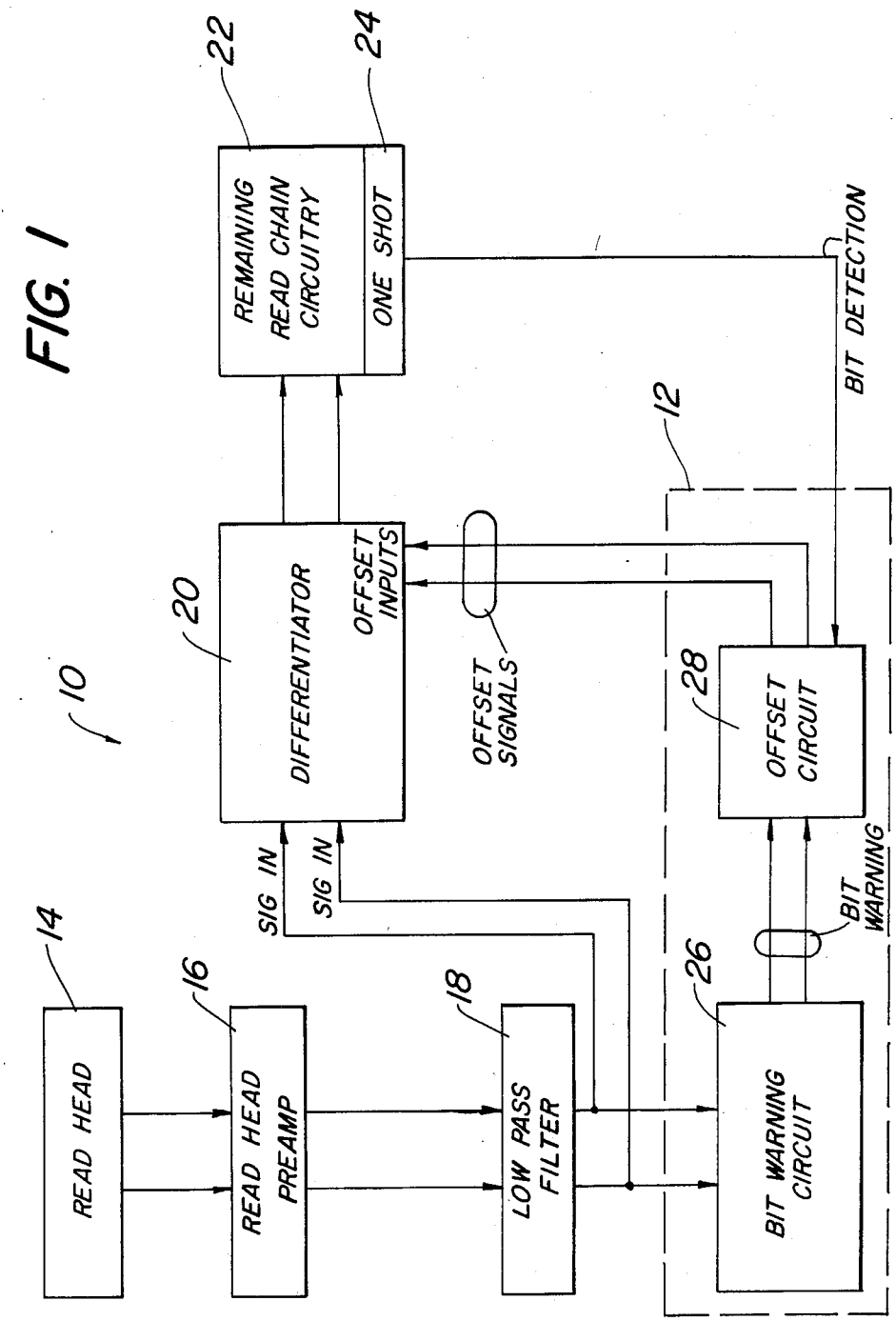
FIG. 1 is a block diagram of a read chain circuit incorporating the teachings of the present invention.

Referring to the drawings, wherein like numerals represent like elements, there is illustrated in FIG. 1 a block diagram of a known read chain circuit labelled generally 10 and incorporating a modification shown within the dotted lines and labelled generally 12. Circuit 10 comprises a read head 14 disposed over a rotating magnetic medium (not shown) in well-known fashion for providing a read signal indicative of digital data stored on a magnetic medium as a series of magnetic flux transitions. The read signal provided by read head 14 is supplied to a read head preamplifier 16 for amplifying the read signal to a usable level. The read signal from amplifier 16 is supplied to a low pass filter 18 that reduces noise picked up by the read head 14. The filtered signal is provided to a differentiator circuit 20 that differentiates the read signal and provides zero crossings in time coincidence with and indicative of peaks in the read signal. The differentiated read signal is supplied to remaining read chain circuitry 22, including a comparator and a time domain filter, as will be explained hereinafter. Circuit 22 includes a standard time domain one shot circuit 24 that is reconfigured according to the present invention so that it is responsive to zero crossings of the differentiated read signal to provide a "bit detection" signal to circuit 12, as also explained hereinafter.

Circuit 12 comprises a bit warning circuit 26 and an offset circuit 28. Bit warning circuit 26 receives the amplified, filtered read signal from low pass filter 18 and provides bit warning signals to offset circuit 28. The occurence of a bit warning signal is indicative of an impending peak in the read signal. The offset circuit 28 is operatively coupled to the differentiator 20 to normally provide an offset to the differentiated read signal. But, offset circuit 28 is responsive to the bit warning signals to remove the offset during the occurrence of peaks in the read signal. Offset circuit 28 is also responsive to "bit detection" signals provided by one shot circuit 24 to reapply the offset after the read signal peak (bit) has occurred. Offset circuit 28 performs the additional function of altering the polarity of the offset applied to differentiator 20 in accordance with the polarity of the differentiated read signal, as will become evidence hereinafter.

Figure 2:
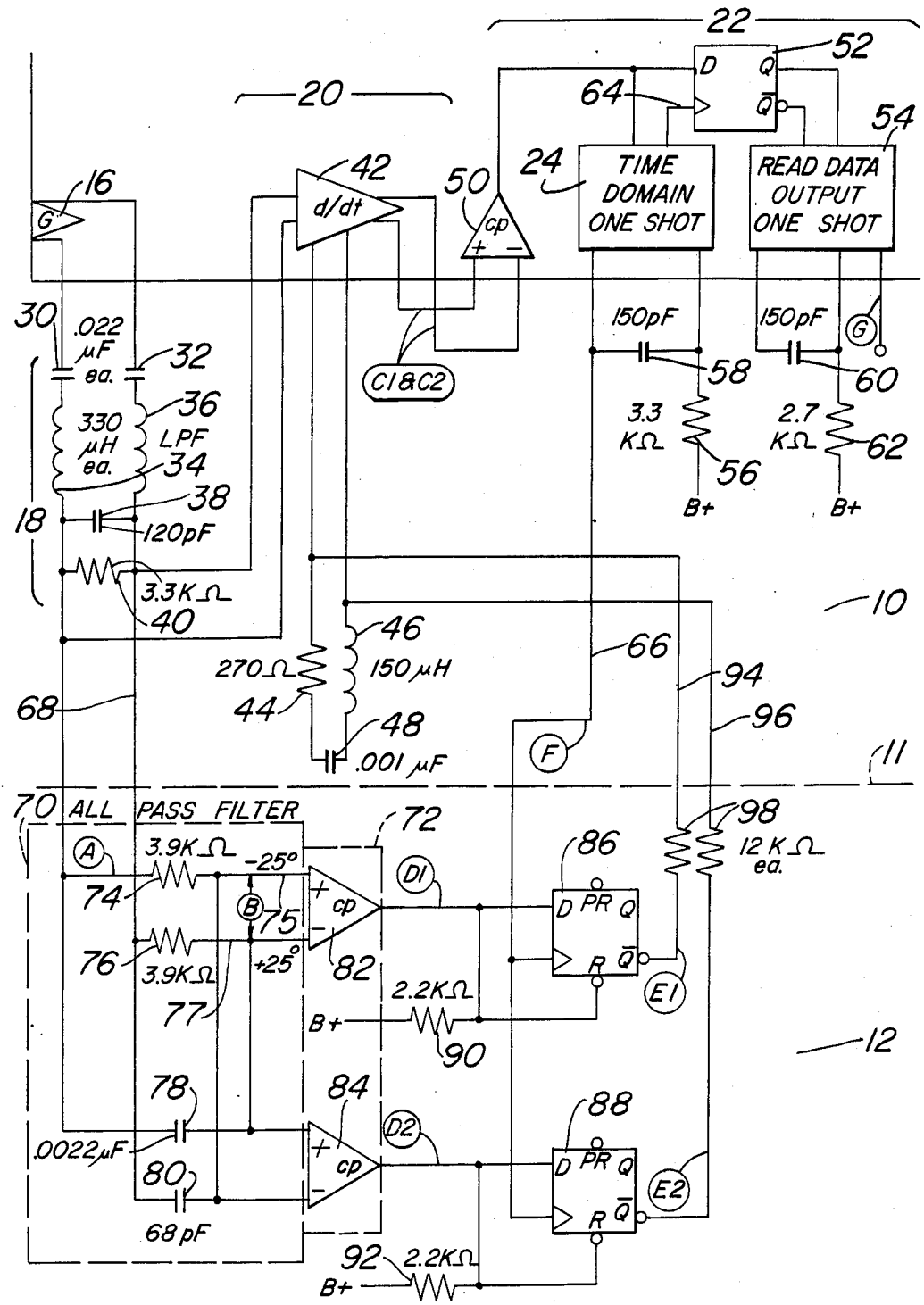
FIG. 2 is a schematic diagram illustrating the details of a read chain circuit incorporating the teachings of the present invention.

Referring now to FIG. 2, the detailed construciton of circuits 10 and 12 will be explained. The circuit 10 above the dotted line 11 represents known read chain circuitry. Circuit 12 below the dotted line 11 represents additional circuitry added to the circuit 10 in accordance with the present invention. Circuit 10 may include a custom read/write chip commonly used in floppy disk drives such as a Motorola MC3470 or an Okidata MSM 151. Such chip includes read head preamplifier 16, differentiator 20 and remaining read chain circuitry 22.

A read signal from read head preamplifier 16 is provided to low pass filter 18 that comprises capacitors 30, 32, and 38, inductors 34 and 36 and resistor 40. As shown, capacitors 30, 32 preferably have a value of 0.022 uf each, inductors 34, 36 each have a value of 330 uH, capacitor 38 has a value of 120 pF and resistor 40 has a value of 3.3 Kohms. The output of preamplifier 16, and hence the output of low pass filter 18 is a differential signal and must be treated as such. The differential output of low pass filter 18 is supplied on a pair of lines 68 to the input of differentiator circuit 20 and to a circuit 70 to be described hereinafter.

Differentiator 20 comprises an differential amplifier 42 configured in well-known manner as an analog differentiator. Differential amplifier 42 includes a resistor 44, an inductor 46 and a capacitor 48 for differentiating the read signal. Preferably, resistor 44 has a value of 270 ohms, inductor 46 has a value of 150 uH, and capacitor 48 has a value of 0.001 uf.

The output of differential amplifier 42 is a differentiated read signal having zero crossings in time coincidence with and indicative of peaks in the read signal. See FIG. 3, waveforms A and C1. The differentiated read signal is supplied to a comparator 50 that squares the differentiated read signal into logic levels. Logic level changes provided at the output of comparator 50 correspond to zero crossings of the differentiated read signal, and hence to peaks in the non-differentiated read signal.

The output of comparator 50 is supplied to a time domain filter 22. Specifically, time domain filter 22 comprises a D flip flop 52, a time domain one shot 24 and a read data one shot 54. The output of comparator 50 is supplied to the D input of flip flop 52 and to an input of time domain one shot 24. Time domain one shot 24 has two outputs, one of which is connected along line 64 to the clock input of D flip flop 52, the other of which is connected along a line 66 to the circuitry 12 (i.e., "bit detection"). Capacitor 58 and resistor 56 comprise the RC timing circuit of one shot 24. Preferably, capacitor 58 has a value of 150 pf and resistor 56 has a value of 3.3 Kohms. The complementary outputs Q and $\overline{Q}$ are connected to the input of read data output one shot 54. The RC combination of resistor 60 and capacitor 62 comprise the timing circuit of one shot 54. Preferably, capacitor 60 has a value of 150 pF and resistor 62 has a value of 2.7 Kohms.

Time domain filter 22 is not required in the practice of the present invention. Since time domain filter 22 is standard in most read chain circuits, it is convenient to configure it as shown in FIG. 2 to provide a "bit detection" signal on line 66, as explained hereinafter. Thus, if desired, time domain filter 22 may be removed and replaced with any circuit that supplies an indication that a bit has been detected. For example, a toggle flip flop that is reset when a bit has been detected (i.e., output of comparator 50) and is set when a bit warning signal occurs would suffice.

The construction of circuit 12 will now be explained. As previously mentioned, circuit 12 comprises a bit warning circuit 26 and an offset circuit 28. Bit warning circuit 26 comprises an all pass filter circuit 70 that receives the read signal on differential lines 68 and a detection circuit 72. Offset circuit 28 comprises bistable means 86, 88, which preferably are a pair of D flip flops.

The function of circuit 70 is to delay the phase of the read signal by a prescribed amount. In the preferred embodiment, this is achieved by means of an all pass filter circuit comprising resistors 74, 76 and capacitors 78, 80, configured as shown. The circuit 70 is actually two all pass filters operating on the differential read signal appearing on lines 68. The main characteristic of the circuit 70 is that it will pass all frequencies of the read signal at full amplitude but shift the phase of the signal by a varying amount depending on its frequency. The upper leg 75 of the all pass filter 70 serves to shift the read signal by approximately 25° to the lagging, while the lower leg 77 of the filter 70 serves to shift the read signal by approximately 25° to the leading. The detection means 72 is operatively connected to the all pass filter to receive the differential outputs thereof. Specifically, detection means 72 comprises a pair of comparators 82, 84 connected so that their plus and minus inputs receive the differential outputs of all pass filter 70. As shown, the plus input of comparator 82 and the minus input of comparator 84 receive the lagging signal appearing on line 75 of all pass filter circuit 70, while the minus input of comparator 82 and the plus input of comparator 84 receive the leading signal appearing on line 77 of all pass filter circuit 70. Since the comparators 82, 84 are connected differentially to the leading and lagging signals, they see a signal that is the difference of the two. This difference signal, which is the subtraction of two vectors, results in a third vector that is approximately 90° with respect to the undelayed read signal seen on lines 68. The value of the components 74, 76, 78, 80 comprising all pass filter circuit 70 are chosen to shift the phase of the read signal by the desired 90°. Preferably, the value of resistors 74, and 76 is 3.9 Kohms, the value of capacitor 78 is 0.0022 uF and the value of capacitor is 68 pF.

As mentioned, the phase shifting action of the all pass filter circuit 70 results in a delayed read signal that provides zero crossovers that occur just before corresponding zero crossovers of the differentiated read signal. See FIG. 3 and compare waveform B (the output of the all pass filter 70) to waveform C1 (the output of differentiator 20). Hence, zero crossovers of the delayed read signal can be used as an indication of an impending peak, i.e., data bit, in the read signal. The comparators 82, 84 serve not only to subtract the leading and lagging outputs of all pass filter circuit 70, but also to "square up" the delayed read signal and provide logic level changes that are indicative of zero crossovers of the delayed read signal. The logic level changes provided by comparators 82, 84 are indications of impending peaks in the read signal and are referred to herein as the "bit warning" signals. Those skilled in the art will realize that the outputs of comparators 82 and 84 are complementary.

The output of circuit 72 is connected to the offset circuit 28. In particular, the output of comparator 82 is connected to the D input and reset input of D flip flop 86. The output of comparator 84 is connected to the D input and reset input of D flip flop 88. As shown, these inputs are coupled to pull up resistors 90, 92, preferably having a value of 2.2 Kohms each. The clock input of flip flops 86, 88 each receive the output of the time domain one shot 24 (or other "bit detection" circuit) on line 66. This line 66 carries the "bit detection" signal. The $\overline{Q}$ outputs of flip flops 86, 88 are coupled through resistors 98 to the differentiator 20 via lines 94, 96. Preferably, resistors 98 each have a value of 12 Kohm each. As those skilled in the art will appreciate, when the $\overline{Q}$ output of either one of flip flops 86, 88 is low (logic 0), an offset will be applied to the differentiated read signal provided by differentiator 20. In particular, when the $\overline{Q}$ output of flip flop 86 is low, a negative offset is applied to differentiator 20. When the $\overline{Q}$ output of flip flop 88 is low, a positive offset is applied to differentiator 20.

Referring to FIG. 3, the operation of the circuits illustrated in FIGS. 1 and 2 will be explained. FIG. 3 illustrates the timing of various waveforms produced by the circuit of FIG. 2.

Waveform A indicates a read signal recovered from a magnetic storage medium wherein data is stored as a series of magnetic flux transitions. The waveform A is that which appears across the lines 68 in FIG. 2. Waveform A includes peaks 100, 102, 104, each of which is indicative of a data bit stored on the medium. The read signal indicated by waveform A is presented to the differentiator 20 and to the all pass filter circuit 70 as explained.

Waveform B indicates the output of the all pass filter 70 at point B in FIG. 2. The all pass filter 70 delays the phase of the read signal by approximately 90°. Waveform B includes zero crossings 116, 118 and 120 that occur just before the occurrence of peaks 100, 102, 104. Thus, the zero crossings 116, 118, 120 are indications of an impending peak in the read signal.

Waveform C1 indicates the differentiated read signal provided by differentiator 20. As shown, differentiator 20 provides a differentiated read signal having zero crossings 106, 108, 110 in time coincidence with and indicative of the peaks 100, 102, 104. However, as is known, the differentiated read signal may "droop" between the occurrence of low frequency data bits as shown at 112 and 114. The "droops" may cause erroneous zero crossings of the differentiated read signal, and hence provide erroneous data. As mentioned, the purpose of the present invention is to prevent the differentiated read signal from "drooping" by applying an offset thereto between the occurrence of peaks 100, 102, 104.

Waveforms D1 and D2 are the bit warning signals, i.e., the signals that occur at the outputs of comparators 82, 84, respectively. As shown, comparators 82, 84 "square up" the delayed read signal indicated by waveform B. Thus, waveform D1 has changing logic levels at 126 (rising edge), 128 (falling edge) and 130 (rising edge) that indicate zero crossings 116, 118 and 120 of the waveform B. Similarly, waveform D2, which is the complement of D1, has changing logic levels 132 (falling edge), 134 (rising edge) and 136 (falling edge) that are also indictive of zero crossings 116, 118, 120 of the waveform B. The changing logic levels 126, 128, 130 of waveform D1 and 132, 134, 136 of waveform D2 occur just before the occurrence of peaks 100, 102, 104 in the read signal indicated by waveform A, and just before zero crossings 106, 108, 110 of the differentiated read signal indicated by waveform C1. Thus, the changing logic levels of waveforms D1 and D2 are indications of an impending peak in the read signal.

Waveform F indicates the output on line 66 of time domain one shot 24. As shown, time domain one shot 24 is responsive to zero crossings 106, 108, 110 of the differentiated read signal so as to provide a pulse ("bit detection") on line 66 (FIG. 2) each time a zero crossing 106, 108, 110 occurs. Thus, the time domain one shot output 66 goes low at times 138, 142, 146 and, after a prescribed time delay, goes high as shown at 140, 144, 148. In the preferred embodiment, the pulse width or time delay is 500 nsec. Since the output of the time domain one shot 24 is applied to the clock inputs of flip flops 86, 88, the flip flops 86, 88 are responsive thereto to change states according to the status of the signals D1, D2 appearing on their D inputs. Thus, although at time 126 the D input of flip flop 86 is presented with a high (logic 1) logic level, this is not clocked through flip flop 86 until the rising edge 140 of waveform F occurs. At time 140, the flip flop 86 is clocked and the $\overline{Q}$ output thereof goes low as shown at 150 of waveform E1. (Waveforms E1 and E2 indicate the outputs of flip flops 86, 88 respectively.) During the time between the rising edge 126 of waveform D1 and the rising edge 140 of waveform F, the $\overline{Q}$ outputs of both flip flops 86, 88 are high (logic level 1) and no offset is applied to the differentiated read signal. This coincides with the occurrence of peak 100 in waveform A. However, upon the occurrence of rising edge 140 of waveform F, the $\overline{Q}$ output of flip flop 86 goes low (logic level 0) and a negative offset 122 is applied to the differentiated read signal. See waveform C2. With the negative offset 122 applied, the "droop" 112' cannot exceed the offset level 122. Thus, erroneous crossovers are prevented.

When the delayed read signal again passes through zero, as shown at 118, waveform D1 goes low as shown at 128, causing flip flop 86 to reset as shown at 152. Simultaneously, waveform D2 goes high as shown at 134, but flip flop 88 will not change state until the clock pulse is applied by the rising edge 144 of waveform F. Thus, no offset is applied between times 134 and 144. This coincides with the occurrence of peak 102 in waveform A. The rising edge 144 of waveform F clocks flip flop 88, causing its $\overline{Q}$ output to go low as shown at 154 of waveform E2. The zero logic level applied by flip flop 88 to the differentiator 20 causes a positive offset 124 to be applied to the differentiated read signal as shown by waveform C2. Thus, the droop 114' cannot fall below the offset level 124 applied by flip flop 88. As before, when the delayed read signal again crosses zero at 120, the waveform D2 will change state as shown at 136, causing flip flop 88 to reset and remove the offset as shown at 156. Again, no offset is applied during the occurrence of peak 104 of the read signal. It will be appreciated that the above described process is repetitive so as to normally apply the offset but remove the offset just before the occurrence of a peak in the read signal. Moreover, flip flops 86, 88 insure that an offset of proper polarity is applied to the differentiated read signal.

As mentioned, the time delay provided by circuit 24 is not required and the circuit 28 could just as easily be designed to be responsive to the falling edges 138, 142, 146 of waveform F instead of using edges 140, 144, 148.

As illustrated in waveform G, the read data output one shot 54 provides read data pulses 160, 162, 164 indicative of bits recovered by the read chain circuit. The occurrence of pulses 160, 162, 164 are in substantial time coincidence with the rising edges 140, 144, 148 of the waveform F. In the preferred embodiment, the pulse width of the pulses 160, 162 and 164 is 250 nsec.

The present invention may be embodied in other specific forms without departing from the spirit or essential attributes thereof and, accordingly, reference should be made to the appended claims, rather than to the foregoing specification, as indicting the scope of the invention.

I claim:

1. A read back circuit for recovering data stored on a magnetic medium as a series of magnetic flux transitions comprising:
   (a) first means for providing a read signal indicative of magnetic flux transitions on the medium;
   (b) second means operatively coupled to the first means for providing a differentiated read signal having zero crossings indicative of peaks in the read signal; and
   (c) third means operatively coupled to the second means for normally applying an offset to the differentiated read signal and for temporarily removing the offset during the occurrence of peaks in the read signal thereby preventing erroneous zero crossings of the differentiated read signal and wherein the third means comprises phase shifting means operatively coupled to the first means for delaying the phase of the read signal by a prescribed amount and thereby providing a delayed read signal having zero crossings that occur before corresponding zero crossings of the differentiated read signal.

2. Circuit according to claim 1 wherein the phase shifting means delays the phase of the read signal by approximately 90°.

3. Circuit according to claim 1 wherein the phase shifting means is an all pass filter.

4. Circuit according to claim 1 wherein the third means comprises bit warning means for providing an indication of an impending peak in the read signal.

5. Circuit according to claim 4 wherein the bit warning means further comprises detection means operatively coupled to the phase shifting means for providing an output signal indicative of zero crossings of the delayed read signal, the output signal being the indication of an impending peak in the read signal.

6. Circuit according to claim 4 wherein the third means comprises offset means for normally applying the offset to the differentiated read signal and responsive to the indication provided by the bit warning means to remove the offset.

7. Circuit according to claim 6 wherein the offset means comprises bistable means having a data input receiving the indication from the bit warning means and a data output switchable between first and second data states to apply and remove the offset, respectively.

8. Circuit according to claim 7 further comprising time delay means responsive to zero crossings of the differentiated read signal and having an output operatively coupled to a clock input of the bistable means for switching the data output thereof to one of the first and second data states after the expiration of a predetermined time delay of the occurrence of zero crossings of the differentiated read signal.

9. A read back circuit for recovering digital data stored on a magnetic medium as a series of magnetic flux transitions comprising:
   (a) first means for providing a read signal indicative of magnetic flux transitions on the medium;
   (b) second means operatively coupled to the first means for providing a differentiated read signal having zero crossings in substantial time coincidence with and being indicative of peaks in the read signals;
   (c) third means for providing an indication of an impending peak in the read signal and including phase shifting meana operatively coupled to the first means for delaying the phase of the read signal by a prescribed amount and thereby provide a delayed read signal having zero crossings that occur before corresponding zero crossings of the differentiated read signal;

(d) fourth means operatively coupled to the second means and to the third means for normally applying an offset to the differentiated read signal but responsive to the indication provided by the third means to temporarily remove the offset so that the offset is applied only during times in-between the occurrence of peaks in the read signal.

10. Circuit according to claim 9 wherein the first means comprises a magnetic read head, a read head preamplifier and a low pass filter.

11. Circuit according to claim 10 wherein the second means comprises an analog differentiator circuit.

12. A circuit according to claim 9 wherein the phase shifting means comprises
   all pass filter circuit means operatively coupled to the first means for delaying the phase of the read signal by a prescribed amount.

13. Circuit according to claim 12 wherein the third means comprises detection means operatively coupled to the all pass filter circuit means for providing an output signal indicative of zero crossings of the delayed read signal, the output signal being the indication of the impending peak in the read signal.

14. Circuit according to claim 13 wherein the fourth means comprises bistable means having a data input receiving the output signal from the detection means, and having a clock input receiving an output from a time delay means responsive to zero crossings of the differentiated read signal for clocking the bistable means after prescribed time delay of the occurrence of zero crossings of the differentiated read signal, the bistable means being responsive to the output signal from the detection means and to the output from the time delay means to apply and remove the offset to the differentiated read signal.

15. Circuit according to claim 14 wherein the bistable means has a pair of data outputs operatively coupled to the differentiator circuit, the data outputs being switchable between first and second complementary data states to alter the polarity of the offset in accordance with the polarity of the differentiated read signal.

16. In a read back circuit for reading digital data stored on a magnetic medium as a series of magnetic flux transitions and having a magnetic read head, a read head preamplifier, a low pass filter, a differentiator for differentiating a read signal provided by the read head and providing zero crossings indicative of peaks in the read signal, and a time delay circuit, an anti-shouldering circuit comprising:
   (a) an all pass filter receiving the read signal and delaying the phase of the read signal by a prescribed amount;
   (b) a pair of comparators receiving a differential output from the all pass filter and providing signals indicative of zero crossings of the delayed read signal;
   (c) a pair of flip flops each having a data input, a clock input, a reset input and a data output, each data input and each reset input receiving the signal from the comparators, each data output being operatively coupled to an offset input associated with the differentiator, each clock input receiving an output from the time delay circuit, the time delay circuit clocking the flip flops after a prescribed time delay of each zero crossing of the differentiated read signal;
   whereby the data outputs of the flip flops normally apply an offset to the differentiated output signal and the flip flops are responsive to the signals from the comparators and from the time delay circuit to remove the offset only during the occurrence of peaks in the read signal, and further, the flip flops alter the polarity of the offset in accordance with the polarity of the differentiated read signal, thereby preventing erroneous zero crossings of the differentiated read signal.

17. Method of preventing erroneous zero crossings of a differentiated output signal provided by a differentiator circuit differentiating an AC signal comprising the steps of:
   (a) normally applying an offset to the differentiated output signal;
   (b) detecting the presence of an impending peak in the AC signal including delaying the phase of the AC signal by a prescribed amount; and
   (c) removing, in response to the step (b), the offset applied to the differentiated output signal only during the occurrence of peaks in the AC signal.

18. Method according to claim 17 wherein the step (b) comprises
   detecting zero crossings of the delayed AC signal.

19. Method according to claim 17 further comprising the step of altering the polarity of the offset according to the polarity of the differentiated read signal.

20. Method according to claim 17 wherein the phase of the AC signal is delayed by approximately 90°.

* * * * *